Dec. 18, 1934. C. E. BANNISTER Re. 19,397

WELL BORING MACHINE

Original Filed May 21, 1926 3 Sheets-Sheet 1

Inventor
Clyde E. Bannister
by James R. Hodder
attorney

Dec. 18, 1934. C. E. BANNISTER Re. 19,397

WELL BORING MACHINE

Original Filed May 21, 1926 3 Sheets-Sheet 2

Inventor
Clyde E. Bannister
by James R. Hodder
Attorney

Dec. 18, 1934. C. E. BANNISTER Re. 19,397

WELL BORING MACHINE

Original Filed May 21, 1926 3 Sheets-Sheet 3

Inventor
Clyde E. Bannister
by James R. Hodder
Attorney

Reissued Dec. 18, 1934

Re. 19,397

UNITED STATES PATENT OFFICE 19,397

WELL BORING MACHINE

Clyde E. Bannister, Akron, Ohio

Original No. 1,965,563, dated July 10, 1934, Serial No. 271,923, April 21, 1928. Renewed July 20, 1932, which is a continuation of application Serial No. 111,471, May 21, 1926. Application for reissue October 22, 1934, Serial No. 749,361

10 Claims. (Cl. 255—4)

My present invention relates to well boring machines, and more particularly to a well boring machine adapted to be freely suspended in a bore during the boring operation, the present application being a continuation as to all matters in common of my prior and copending application Ser. No. 111,471, filed May 21, 1926.

An important object of the present invention is the provision of a machine operating with an oscillating motion while hanging freely in a well or bore.

A further object of the invention resides in the provision of such a machine wherein the cutter or abrasive member is oscillated in opposite directions at predetermined intervals, while the machine carrying the cutter is restrained from materially rotating in a direction opposite to that of the cutter, solely by its own inertia, and without the use of any anchoring means or devices.

Another object of the invention resides in operating the motor which in turn operates the cutter, by the same water which is utilized to flush the cuttings from the bit at the bottom of the bore and out of the bore.

Another feature of the present invention resides in utilizing a cutter which is of greater diameter than the outer diameter of the machine carrying the cutter. In this way, the cutter will cut or form, in advance of the machine, a bore of greater diameter than the machine, thus offering no resistance to the passage of the machine through the bore, and also leaving ample room at the sides of the machine to permit the passage of the flushing stream past the machine and out of the bore. So far as I am aware, I am the first in this art to have devised a freely suspended, deep-earth boring machine wherein the cutter, bit or abrasive member has a diameter greater than the outer diameter of the machine to which it is attached and by which it is operated, although I am aware that this principle has been utilized in rock drilling machines, where relatively shallow or short lengths of cut are effected.

A further and important feature of the present invention resides in utilizing, in the motor mentioned above, a reciprocating piston and a spiral mechanism which will convert the reciprocating motion of the piston into oscillations of the piston rod and the cutting instrumentality carried thereby. The extent of each oscillation of the cutter will be determined by the stroke of the piston, and the speed of oscillation will be determined by the speed of travel of the piston.

My present invention will thus do away with rigid drill stems and the consequent tedious "making up" and "breaking down" of said stems while entering the well or bore and being withdrawn therefrom. My invention will also eliminate the delays now encountered in changing drilling tools, taking cores, and like operations required by present processes.

I am aware that drilling or boring machines have been heretofore devised, suspended by cables or flexible elements, but these prior machines are impractical because they rotate in one direction only, which thus makes it necessary to fasten or anchor them to the walls of the bore in order to prevent the machines themselves from rotating in a direction opposite to the direction of rotation of the cutting tools utilized. This necessity of anchorage renders it impossible to gradually feed such prior machines into the bore as the depth is increased. Also, when the cutting tool continuously rotates in one direction, the bore cut by said tool will not be straight, as will be understood.

Insofar as the straightness of a bore formed by my novel method and apparatus is concerned, it need only be stated that wells drilled by the prior cable-tool methods were more nearly straight than those drilled by the usual rotary methods.

Furthermore, by the use of the continuously oscillating cutter, a straight bore will be assured, whereas rotating tools or cutters are very apt to deviate from a straight course and to cut at an angle, thus forming an unsatisfactory bore.

High temperatures, due to friction, increased depth, or similar heat-creating conditions, will be effectually overcome by the circulation of the water through and around the machine.

Another object of my invention is to so construct the machine that replacements, repairs, and the like, may be readily made. The device is efficient, positive in action, and economical in operation.

As the machine descends into the bore which it is cutting, there will, of course, be a tremendous hydrostatic head, as well as working pressure, in the well or bore, which will tend to work into the motor and interfere with the working of the piston and other moving parts. To overcome this difficulty and objection, I have devised novel means to automatically retain the oil content of the motor equal to the hydrostatic head pressure plus the pump pressure. In this manner all the working parts are constantly submerged in oil which is at the same hydrostatic pressure as the water at the same depth, plus the actual working pressure at that particular depth.

I further provide, in my novel machine, novel means to free the machine from surrounding earth or other material, in case of cave-ins, or should the machine become stuck in withdrawing it from the bore. To accomplish this desirable result, I provide a tubular member, to which the flexible hose is attached, and in which member are a plurality of ports. Surrounding this tubular member is the outer casing of the machine, also having a plurality of ports therein, normally disalined from the ports in the tubular member, and kept in this disalined position by means of a spring. When withdrawing the machine from a bore, should the machine meet an obstruction, cave-in or the like, the pull of the flexible hose, coupled with the weight and drag of the machine, will draw the tubular member through the upper end of the outer casing until the ports in the tubular member and the ports in the casing are alined, whereupon a stream of water may be forced through the hose and through the alined ports directly into the bore, which will effectually disintegrate and wash out of the bore the material which is preventing withdrawal of the machine. It will be appreciated that this last described feature is not limited to use with the particular machine illustrated and described herein, but is applicable to any drilling device, as will be readily appreciated and understood by those skilled in this art.

A still further feature of the present invention consists in utilizing a pair of sleeves to control the inlet and exhaust of the water or fluid, one of said sleeves being above the piston and the other sleeve being below said piston. Contact of the piston with the sleeves will move said sleeves toward desired position, and I have devised novel means to accelerate said sleeve movement, as well as providing means to positively hold the sleeves in the position to which they are moved until they again are engaged and moved by the piston in its travel. These sleeves are so constructed and assembled that movement of one sleeve will actuate the opposite sleeve, thus insuring against delay in movement of the sleeves, and insuring efficient and proper action and operation of the machine at all times.

I believe that my machine, as above briefly described, is novel, as well as many of the elements also described above, and I have therefore claimed the same broadly in the present application.

The above and other objects of the invention, details of construction, combinations of parts, and advantages, will be hereinafter more fully described and claimed.

Referring to the drawings, illustrating preferred embodiments of the present invention, Fig. 1 is a diagrammatic view illustrating my novel machine in the process of boring a well;

Figure 1:
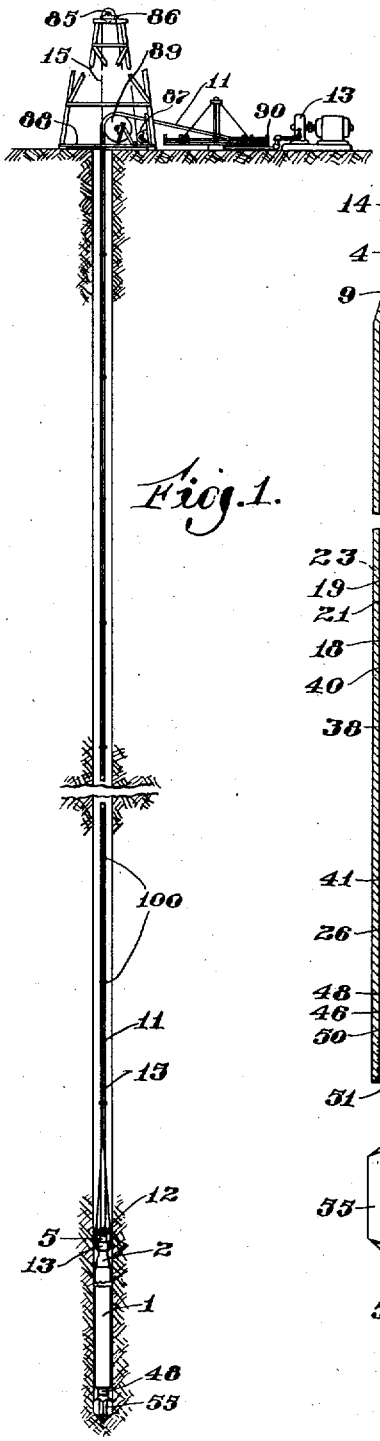
Figure 2:
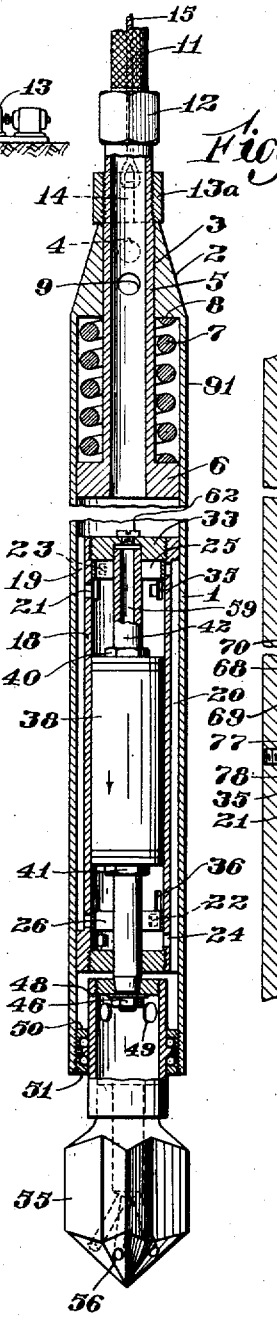
Fig. 2 is a vertical sectional view on the line 2—2 of Fig. 7.
Figure 11:
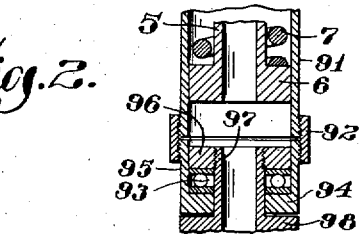
Fig. 11 is a vertical sectional view of the swivel joint.

Referring now to the drawings for a particular description of the invention, its details and operation, 1 designates a tubular shell or casing, and 2 designates a reduced and tapered upper end portion formed with a bearing 3 and ports 4, 4.

Extending and fitting through the bearing 3 is a long tubular nipple or slip-sleeve 5 having an annular flange or spring seat 6, on which is seated a strong coiled spring 7 which surrounds said nipple and whose upper end works against the internal annular shoulder 8 in the upper end of the casing 1. This nipple 5 has lateral ports 9, 9, alined with but normally out of registration with the ports 4, being held out of registration by the spring 7. The nipple 5 projects above the upper end of the casing 1 and has connected to its upper end a flexible tube or hose 11, a coupling 12 being provided between the hose 11 and nipple 5. The hose 11 extends upwardly to the surface of the ground and is adapted to be connected to a pump 13, or other suitable source of fluid pressure, and through which fluid under pressure is supplied to the pressure motor, to be described hereafter. Threaded or otherwise connected to the upper end of the nipple 5 is a collar 13*a* having lateral ears or lugs 14 to which the lower ends of the suspending cable 15 are attached, said ends meeting at any desired distance above the machine. The apparatus is held suspended in the bore by this cable and is, of course, withdrawn by means of this cable 15 when desired. The cable 15 runs up over a pulley 85 in the crown block 86 and back to a drum 87 on the derrick floor 88. The fluid pressure hose 11 runs from the upper end of the machine up alongside the cable 15 to the top of the hole, then over a vertical wheel 89 to a horizontal hose rack 90. This hose is clamped to the cable 15 at predetermined intervals, as at 100, thus relieving the pressure hose 11 of any undue strain.

The spring 7 is contained within a casing 91 and threaded to the lower end of the casing 91 is a collar 92, and to this collar 92 is affixed a swivel joint consisting of a bearing 93 carried by the internal flange 94 of a casing 95. Above the bearing 93 is a ring 96 and on this ring is threaded the upper end 97 of a length of leaded pipe 98, this pipe 98 being of any suitable length for the weight of pipe desired. The swivel joint just described will permit a rotation of the entire working-barrel.

Figure 6:
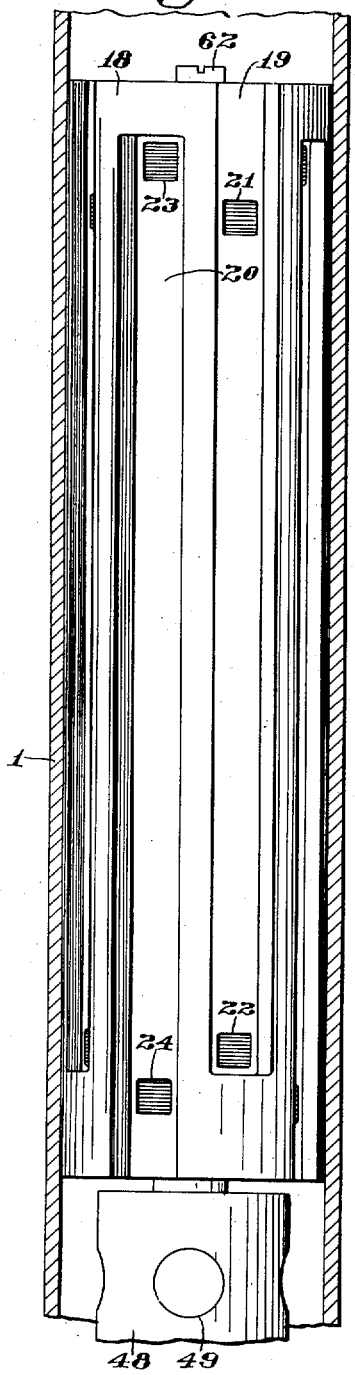
Fig. 6 is a side elevation of the inner casing, with the outer casing in section, illustrating the water inlet and exhaust channels.
Figure 5:
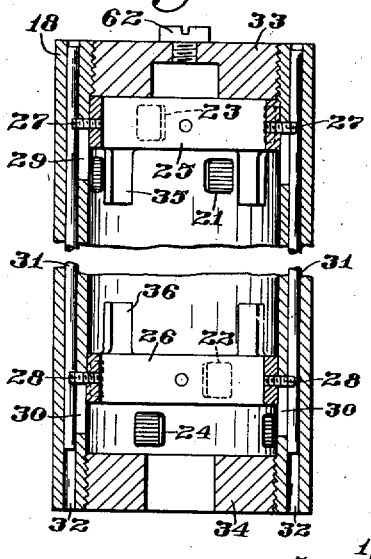
Fig. 5 is a vertical sectional view on the line 5—5 of Fig. 7.
Figure 9:
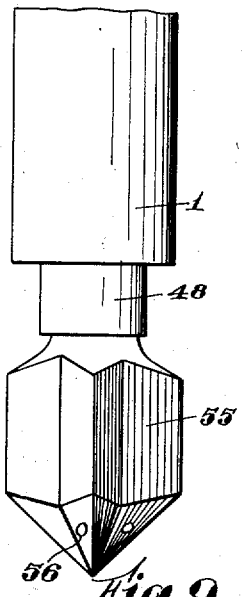
Fig. 9 is a side elevation of the lower portion of the machine and cutting tool or bit.
Figure 7:
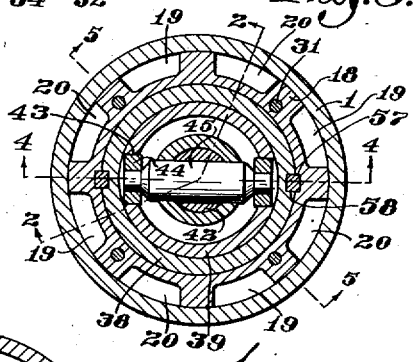
Fig. 7 is a cross-sectional view on the line 7—7 of Fig. 4.
Figure 8:
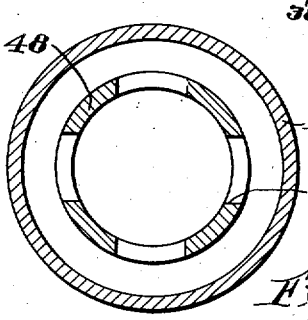
Fig. 8 is a cross-sectional view on the line 8—8 of Fig. 4.

Fixed in the casing 1, beneath the pipe 98, there is an inner casing or cylinder 18, having vertical inlet channels 19, and vertical discharge or exhaust channels 20. The inlet channels 19 have upper and lower inlet ports 21 and 22 respectively leading to the interior of the inner casing 18, and the discharge or exhaust channels 20 have the upper and lower discharge ports 23 and 24 respectively, leading from the interior of the casing 18. The upper ends of the inlet channels 19 are open, as clearly illustrated in Fig. 6, but their lower ends are closed, and the lower ends of the discharge channels 20 are open but their upper ends are closed.

Slidably fitted within the cylinder 18 are the annular valves or sleeves 25 and 26 projecting from which are radial pins 27 and 28 respectively which work or slide through the vertical bearings 29 and 30 respectively. The pins 27 and 28 are connected by valve connecting rods 31 which work in the rod bearings 32 in the cylinder wall in order that the valves 25 and 26 may move in unison. The ports 21 and 24 are so disposed and arranged that when one series of inlet ports are opened by their valve the series of discharge or exhaust ports at the same end of the cylinder will be closed by the said valve, and the reverse will be true of the corresponding series of inlet and discharge ports at the opposite end of the cylinder. Also, when one series of discharge ports are opened by their valve the inlet ports at the same end of the cylinder will be closed and the reverse will be true of the inlet and discharge ports at the other end of the cylinder. The upper and lower ends of the cylinder 18 have the respective plugs 33 and 34 threaded therein or otherwise attached thereto. The valve 25 has valve extensions or prongs 35 extending downwardly therefrom and the valve 26 has similar valve extensions or prongs 36 extending upwardly therefrom.

Figure 4:
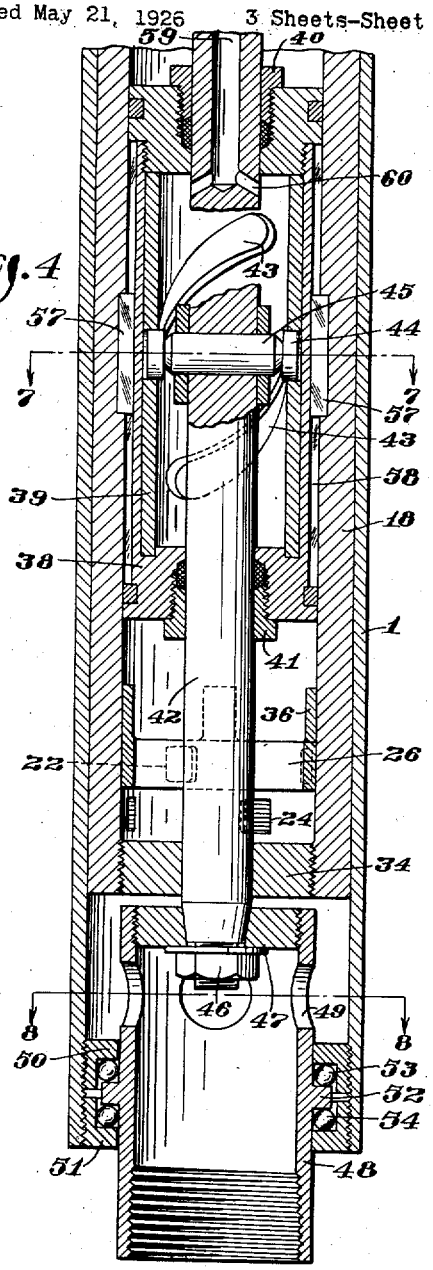
Fig. 4 is a vertical sectional view on the line 4—4 of Fig. 7.

Splined within the cylinder 18 between said valves is a hollow piston 38 having a liner 39 therein and provided with the end stuffing boxes 40 and 41 forming bearings on the shaft 42. This shaft 42 is mounted in bearings in the plugs 33 and 34, and extends beneath the latter, said extended end being connected, by nut 46 and washer 47 to the chuck or drill collar 48. The upper end of this chuck within the casing 1 is provided with inlet ports 49, and said chuck works between the bearing rings 50 and 51 and has an annular rib 52 which runs between the bearings 53 and 54, retained by said bearing rings, said rings being threaded into the lower end of the casing 1, as clearly illustrated in Fig. 4. The bit 55 is connected to the lower end of this chuck 48 in any desired manner, as by the threading herein illustrated. This bit has channels 56 extending therethrough. Any suitable type of drill, bit or boring tool may be employed, the type depending on the character of the formation being pierced. Also, the bit 55 is preferably constantly of greater diameter than the diameter of the machine to which it is attached, in order that the machine will meet with no resistance in following the bit as it works down into the bore which it is forming, said bit being constructed and arranged to effect an equal cutting action in either direction of oscillation.

The splining of the piston in the liner casing is effected by keys 57 in the inner casing 18, which keys cooperate with keyways or vertical grooves 58 in the piston 38.

The upper end of the shaft 42 has a bore or channel 59 which discharges into the interior of the piston 38 through inclined channels 60, and alined above said bore the plug 33 has a port 61, normally closed by the plug 62 and through the plug 33 the piston may be supplied with lubricant which normally fills the same.

The operation of my novel apparatus, as thus far described, is simple, and will be readily understood by those skilled in this art. Fluid, preferably water, is forced down through the hose 11, nipple 5 and pipe 98 into the casing or shell 1, and enters, through the channels 19, the upper and lower inlet ports 21 and 22 alternately. When fluid enters the inlet ports 21, the piston 38 will be forced downwardly and its lower end will strike the valve extensions 36 on the valve 26 and move both valves downwardly, meanwhile, in its downward passage, forcing the water in the casing 18 beneath said piston out through the ports 24 which are open during the downward travel of the piston. As the valves move downwardly the valve 26 will close the discharge ports 24 and open the inlet ports 22 and the valve 25 will open the discharge ports 23 and close the inlet ports 21. Fluid under pressure will then be admitted through the inlet ports 22, beneath the piston, and will raise said piston and the water in the casing 18, above the piston, will be discharged through the ports 23 and when the piston strikes the valve extensions 35 of the valve 25, the valves will be moved upwardly to open the upper inlet ports and close the lower ones and to close the upper discharge ports and open the lower ones. This operation will be repeated and continued until the fluid pressure is shut off. The water discharge passes from the casing or cylinder 18 down and through the ports 49 into the interior of the chuck and thence through the channels 56 in the bit 55, and thence to the bottom of the bore to flush the cuttings from the bit at the bottom of the bore. Because of the fact that the bit 55 is wider than the machine to which it is attached and which follows it through the bore, the water will have no difficulty in passing between the walls of the machine and the walls of the bore, in an upward direction to a suitable pit or reservoir, whence it may be re-pumped and again passed through the hose 11, thus utilizing the same fluid for running the motor and the machine as is utilized for flushing the bore. This is an important feature, resulting in great economy of operation and simplicity of structure.

As the piston 38 reciprocates up and down, these up and down reciprocations will be converted into oscillations of the shaft 42 through the medium of rollers 44 in the spiral bearing grooves 43, and the bit or boring tool will thus be oscillated, and will gradually break away the formation against which it operates at the bottom of the bore. The rollers 44 are carried on the ends of a pin 45 extending transversely of the shaft 42 and fixed therein. The load carried by the bit, or other abrading member, may be readily regulated by means of the cable 15.

The distance of each oscillation of the bit 55 will of course, be determined by the extent of the spiral grooves 43, and the stroke of the piston, and the speed of oscillation of the bit will be determined by the speed of operation of the piston 38.

It will be readily understood that the inertia of the machine will restrain the machine itself from any material turning, which would allow the abrading tool or bit to remain stationary. If the bit or abrading tool utilized were subjected to a continuous rotating action the machine would, of course, gradually develop a rotating action in a direction opposite to the direction of rotation of the bit, and this would necessarily result in stoppage of the bit. I believe that this broad idea of utilizing an oscillating abrading tool or bit, utilizing the inertia of the machine to make these oscillations possible, is basically novel, and I have therefore claimed this principle broadly in the present application.

The oscillations of the abrading member or bit will necessarily transmit some slight motion to the machine. The torque which is required to turn the abrading member in one direction will impart an acceleration in the opposite direction to the machine. However, the displacement of the machine, resulting from the said angular acceleration, will be restrained to a very slight vibratory oscillation by making the weight and inertia of the machine too great to be displaced to an undesirable extent, during the time of one oscillation. This slight oscillation of the machine has been established as approximately one-tenth to one-twentieth as much as the oscillations of the abrading member itself. However, there is an advantage to this vibratory oscillation of the machine, viz., such vibration, or slight oscillations of the machine will store up energy which will tend to jar the abrading member loose, at the end of each of its individual oscillations, and start it on the return motion or oscillation.

The apparatus may be withdrawn from the bore through the cable 15 and in withdrawing the apparatus the spring 7 will carry the load and be compressed, thus bringing the ports 9 into registration with the ports 4. Should the apparatus become stuck in the bore, by a cave-in or otherwise, the water may be pumped down through the hose 11 and nipple 5 and out through the ports 9 and 4 to flush out and wash away the surrounding material and thus free the apparatus so that it may be withdrawn from the bore. If desired, the spring 7 may be of sufficient strength to remain inoperative unless and until an obstruction is encountered in withdrawing the apparatus from a bore, whereupon, on meeting with resistance too great to be overcome by the cable 15, the spring will function to allow the ports 9 and 4 to be put in registry and permit the flushing operation above described.

It will thus be readily appreciated that I have devised a deep earth boring apparatus which is novel, which is simple in construction and operation, and which is economical, among other reasons, because of the fact that I utilize the same fluid to operate the motor as is used to flush out the bore, whereas formerly it has been customary to utilize two separate fluids, or two separate lines of fluid, to accomplish these results.

Figure 10:
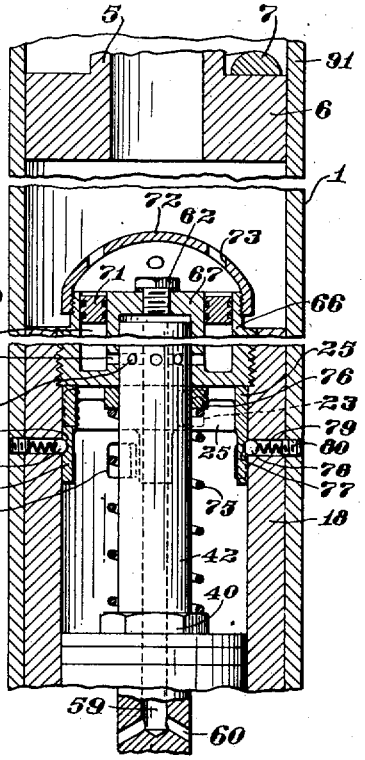
Fig. 10 is a vertical sectional view of the mechanism for maintaining the oil in the motor under the same hydrostatic pressure as the water pressure at the same depth, and also illustrating the sleeve holding and actuating means.
Figure 3:
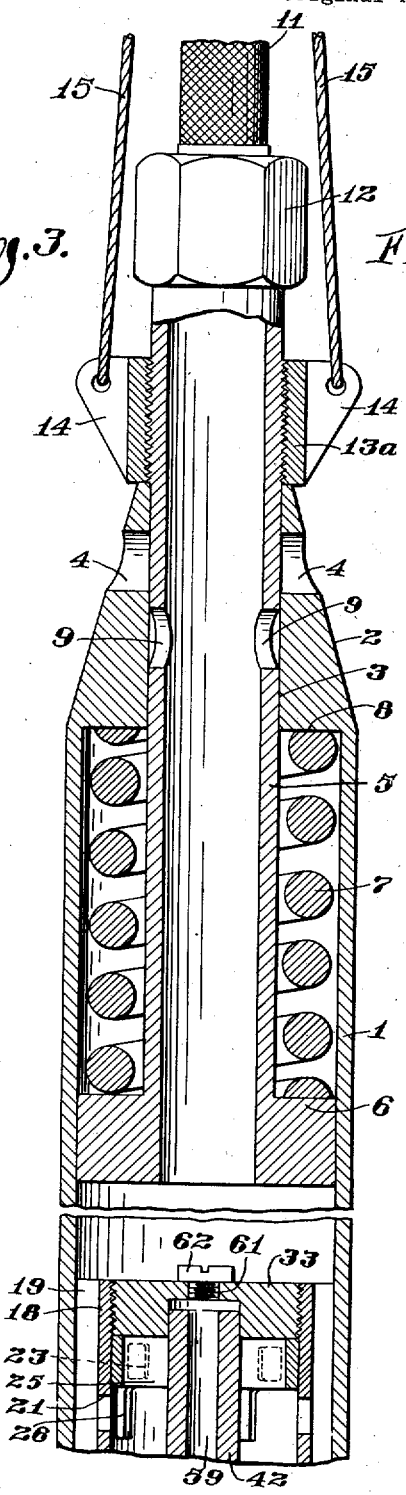
Fig. 3 is a vertical sectional view of the upper portion of the machine.

As the apparatus descends into a bore, the hydrostatic head or pressure, as well as the pump pressure, increases and, at considerable depths there is a tremendous pressure on the apparatus. This pressure will even, in some instances, get so great that it will displace the oil in the piston, and the entrance of the water into the piston will, of course, injure and affect the interior working parts of the motor. To overcome this tendency to leakage, and to insure that the oil pressure within the piston will always be the same as the hydrostatic head and pump or working pressure outside of the piston, I have devised the novel structure illustrated in Fig. 10. In this form of the structure, I substitute, for the plug 33, a plug 66 having an upstanding central portion or lug 67 provided with ports 68 alined with ports 69 in the upper end of the shaft 42, the ports 69 leading to the central bore 59 in the said shaft. Surrounding the lug 67 is a lubricant reservoir 70 of any desired or commensurate length and size for desired oil content, and between the outer wall of the lug 67 and the inner wall of the plug 66 is a floating piston 71. The plug 62 is provided to permit filling or loading of the device with proper lubricant. Threaded to the upper end of the plug 66 is a cap 72 provided with a plurality of perforations 73 to permit free passage of water therethrough. As the device descends into a bore, and the hydrostatic head and pump pressure is increased, the water entering through the perforations 73 in the cap 72, will exert a pressure against the floating piston 71, which will lower the piston through the reservoir 70 and compress the oil within the device until it reaches the same pressure as the pressure outside of the oil chambers. As the pressure is released or reduced, the piston 71 will gradually assume its normal position, thus automatically keeping the lubricating oil under the same pressure that exists in the well bore and hose.

I believe that this feature is also novel, and have therefore claimed the same in this application.

In order to accelerate the action of the valves 25 and 26, I surround the shaft 42, above the piston 38, with a coiled spring 75 resting at one end on the stuffing box 40, and on the other end against a ring or collar 76 formed in the valve 25 and also surrounding the shaft 42. I also provide recesses 77 in each valve to receive balls 78 held in position by springs 79 and set screws 80. The arrangement of recesses, balls, screws and springs is similar in each of the valves 25 and 26.

Thus the piston, in its travel, compresses the spring, which, however, when fully compressed, preferably has not quite enough energy to move the valve, which is held in place by the balls 78 and springs 79. The piston, continuing along its stroke, finally strikes the valve extensions and dislodges the balls. Once the balls are dislodged, the spring will snap the valve across the ports which are to be closed, giving a positive action.

In the meantime the valve rods 31 are pulling the valve on the opposite end into the position where the balls will fall into place in the recesses in the valve. On the return stroke of the piston, the pent-up energy of the spring will assist in starting the piston in the opposite direction.

It will be appreciated by those skilled in this art that there are many novel features in my present apparatus, and it is my desire and intention to include claims to all of these novel features in this present application.

All threaded joints and unions throughout the entire machine illustrated and described herein will, of course, be locked in such a manner as to prevent twisting off during oscillation or operation. This locking may be performed in any convenient, suitable or desirable manner, several methods being well known, and illustration and description thereof not being deemed necessary in the instant application.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. Well boring mechanism, comprising a barrel, non-rigid supporting means therefor, a boring member supported by said barrel, and fluid pressure operated means adjacent to said boring member to effect axial oscillation thereof, the mass of said barrel with respect to said boring member and said fluid pressure operated means being such that said barrel will be substantially unmoved by the oscillation of said boring member.

2. Well boring mechanism, comprising a barrel, non-rigid supporting means therefor, a boring member supported by said barrel, and fluid pressure operated means located in said barrel to effect axial oscillation of said boring member, the mass of said barrel with respect to said boring member and said fluid pressure operated means being such that said barrel will be substantially unmoved by the oscillation of said boring member.

3. Earth boring mechanism, comprising a boring member, an inertia support for said member of substantially greater weight than said member and its moving parts, and fluid pressure operated means adjacent to said boring member to effect axial oscillation thereof at such a speed as to obviate substantial movement of said inertia support.

4. Earth boring mechanism, comprising a boring member, an inertia support for said member of substantially greater weight than said member and its moving parts, and fluid pressure operated means adjacent to said boring member to effect axial oscillation thereof at such a speed as to obviate substantial movement of said inertia support independently of external restraining means.

5. Well boring mechanism, comprising a barrel, a support therefor, a swivel joint between said barrel and its support, a boring member supported by said barrel, and fluid pressure operated means housed within said barrel to effect axial oscillation of said boring member, the mass of said barrel with respect to said boring member and said fluid pressure operated means being such that said barrel will be substantially unmoved by the oscillation of said boring member.

6. In a flexibly suspended boring machine, a boring member, a support for said member, and fluid pressure operated means to effect boring oscillation of said boring member, the mass of said support relative to said boring member and its moving parts being such that said support will be substantially unmoved by oscillation of said boring member.

7. Well-boring apparatus comprising a rotative bit, supporting means and pressure-fluid supplying means at the top of the well, suspension and fluid-conducting means extending therefrom into the well without anchoring contact against the wall thereof, and, interposed operatively between the last said means and the bit, a fluid-operated motor having no anchoring connection to the wall of the well and constructed to discharge the fluid adjacent the bit for washing the cuttings to the top of the well, said motor comprising a fluid-impelled member having driving connection to the bit and an inertia member for sustaining the force of reaction of the fluid against said member without transmittal of the full torque to said suspension means.

8. Well-boring apparatus comprising an oscillating bit, means for oscillating said bit, an inertia member closely confined to the vicinity of the bit for sustaining locally by its inertia substantially the entire reaction force of the said oscillating means, and means for circulating a fluid to wash the cuttings to the top of the well.

9. Well-boring apparatus comprising a full-gauge oscillating bit, a motor immediately adjacent the bit for oscillating said bit, an inertia member closely confined to the vicinity of the bit for sustaining locally by its inertia substantially the entire reaction force of the said oscillating means, and means for circulating a fluid to wash the cuttings to the top of the well.

10. Apparatus as defined in claim 8 in which the inertia member is oscillatory and has the same axis of oscillation as that of the bit.

CLYDE E. BANNISTER.